United States Patent [19]
Hashimoto et al.

[11] Patent Number: 6,047,821
[45] Date of Patent: Apr. 11, 2000

[54] DISC STORAGE CASE

[75] Inventors: Noritsugu Hashimoto, Takaoka; Naoki Nishiguchi, Imizu-gun, both of Japan

[73] Assignees: Takaoka Seiko Co., Ltd., Toyoma; Noritsugu Hashimoto, Takaoka, both of Japan

[21] Appl. No.: 09/365,854

[22] Filed: Aug. 3, 1999

[51] Int. Cl.[7] .................................................. B65D 85/57
[52] U.S. Cl. ...................... 206/303; 206/308.1; 206/493
[58] Field of Search ................................. 206/232, 303, 206/307, 308.1, 308.3, 309, 310, 387.1, 387.13, 397, 493; 369/282, 291

[56] References Cited

U.S. PATENT DOCUMENTS

| 3,638,788 | 2/1972 | Solomon | 206/387.13 |
| 3,747,745 | 7/1973 | Esashi et al. | 206/387.1 |
| 4,026,615 | 5/1977 | Tazaki et al. | 206/387.1 |
| 4,235,334 | 11/1980 | Ahn | 206/387.1 |
| 5,377,825 | 1/1995 | Sykes et al. | 206/232 |
| 5,629,823 | 5/1997 | Mizuta | 369/291 |
| 5,713,463 | 2/1998 | Lakoski et al. | 206/308.1 |
| 5,848,689 | 12/1998 | Mueller | 206/308.1 |
| 5,894,924 | 4/1999 | Koch | 206/308.1 |

*Primary Examiner*—Jim Foster
*Attorney, Agent, or Firm*—Varndell & Varndell, PLLC

[57] ABSTRACT

Disc storage case (1) for storing a plurality of discs (20) comprises a case body (2) having a cylindrical protuberance (4), the outer diameter 4a of which is encompassed by an elastic member (5), and a protrusion (10) that freely enters and exits the inner diameter (4a) of the protuberance (4).

5 Claims, 7 Drawing Sheets

FIG.8

DISC STORAGE CASE

BACKGROUND OF THE INVENTION

1. Field of the Invention

The present invention relates to a disc storage case for storing discs, and more particularly to an improved disc storage case for storing discs having an information storage area, such as compact discs (CD), CD-ROMs and CD-RAMS.

2. Description of the Related Art

Generally, discs, such as compact discs (CD), CD-ROMs, and CD-RAMs, are stored and sold in a conventional disc storage case.

The conventional storage case used for storing these discs consists of a case body and a freely opening and closing lid that covers the top of the case body. In the center of the case body is formed a protuberance over which is placed the round positioning hole formed in the center of a disc.

When a disc is stored in such a disc storage case, the positioning hole of the disc is placed over the above-mentioned case body protuberance, the disc is secured on the protuberance, and the case body is closed with the lid to store a single disc in the case.

Further, for a disc storage case that stores a plurality of discs, a plurality of the above-mentioned case bodies each having a protuberance that supports a single disc are mutually joined. Each protuberance in the joined plurality of case bodies supports one disc, which is placed over the protuberance, so that the disc storage case can store a plurality of discs.

Storing a plurality of discs using the above-described conventional disc storage cases is disadvantageous, however, in that case bodies having protuberances for fitting and supporting the aforementioned individual discs must be prepared and joined together in a number equal to the number of the discs to be stored, with the result that such conventional disc storage cases involve using numerous parts and performing numerous manufacturing steps, and are therefore expensive.

Another drawback of the conventional disc storage case is that when a plurality of discs are loaded in the disc storage case or removed from the disc storage case, the number of lids that must be opened or closed is equal to the number of discs being loaded or removed, and each disc must be individually placed over the case body protuberance or individually removed from the case body protuberance, increasing the complexity of operations involved in the loading or removing a plurality of discs.

SUMMARY OF THE INVENTION

With the foregoing in view, it is an object of the present invention to provide a disc storage case which has a simple construction and which allows a plurality of discs to be loaded and removed with ease.

Aimed at overcoming the aforementioned shortcomings, a disc storage case for storing discs having a round positioning hole in the center thereof in accordance with the present invention comprises a case body having in a center thereof a cylindrical protuberance whose inner diameter and outer diameter are expandable and contractible; a cylindrical elastic member disposed so as to encompass the outer diameter of the protuberance; a cylindrical protrusion that freely enters and exits the inner diameter of the protuberance and that causes the outer diameter of the protuberance to expand when inserted into the inner diameter of the protuberance; and a lid for covering the case body, wherein the positioning hole of the disc is fitted over the protuberance via the elastic member and the protrusion is inserted into the inner diameter of the protuberance so that the outer diameter of the elastic member is expanded via the protuberance and the disc is supported on the protuberance by mating the positioning hole with the peripheral surface of the elastic member.

DESCRIPTION OF THE PREFERRED EMBODIMENTS

An embodiment of a disc storage case according to the present invention will now be described.

Figure 1:
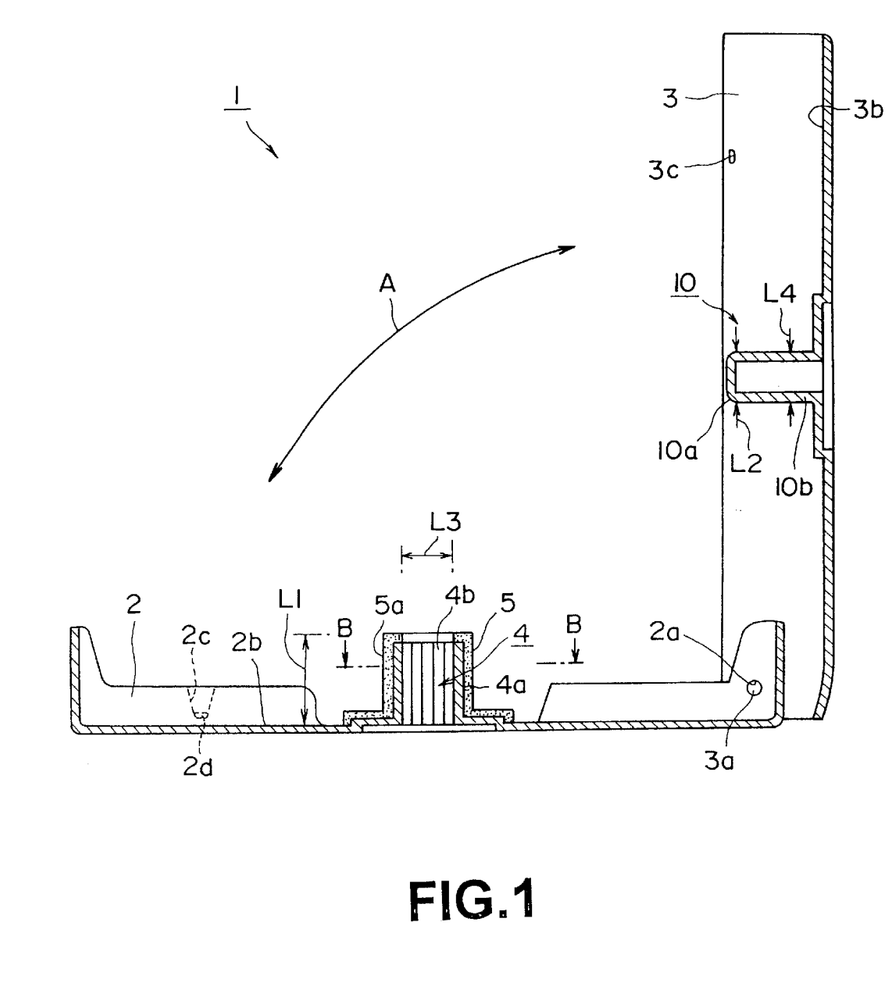
FIG. 1 is a schematic sectional view of a disc storage case according to the present invention.

FIG. 1 is a schematic sectional view of a disc storage case 1 according to the present invention.

The disc storage case 1 comprises a flat, square case body 2 and a lid 3 that freely opens and closes to cover the top of the case body 2.

Of these components, the lid 3 is supported such that rotation thereof in the direction of Arrow A in relation to the case body 2 is allowed by means of an arrangement in which a pair of protuberances 3a (only one is shown) extending on both sides from the lower edge of the lid are fitted into a pair of bearing holes 2a (only one is shown) formed in the rearward portion on the right side of the case body 2.

In the center of the top surface 2b of the case body 2, a cylindrical protuberance 4 formed integrally with the case body 2 and having expandable and contractible outer diameter (external peripheral surface) 4a and inner diameter (internal peripheral surface) 4b is provided extending upward to height L1, and over the outer diameter 4a is encompassed by a cylindrical elastic member 5.

Figure 2:
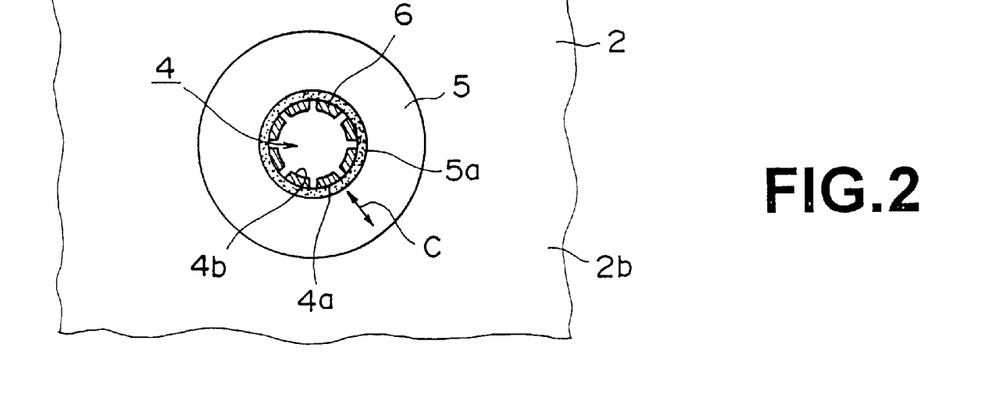
FIG. 2 is a sectional view at line B—B of FIG. 1.
Figure 3:
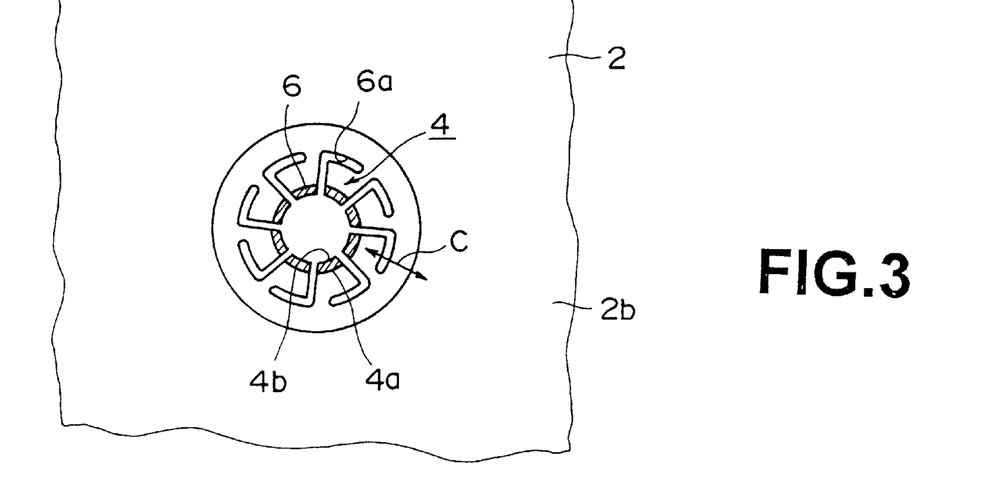
FIG. 3. is a sectional view at line B—B of FIG. 1 with an elastic member omitted.

As shown in FIG. 2, which is a sectional view at line B—B of FIG. 1, the protuberance 4 consists of a plurality of protruding members 6 of the same shape arranged in a circle. As shown in FIG. 3, which depicts a state in which the elastic member 5 is removed, it is formed by forming approximately L-shaped slits 6a in a circle with a mutual specified pitch apart when the case body 2 is monolithically molded together with the plurality of protruding members 6 by injection molding or some other process. The adjacent slits 6a allow the protruding members 6 to be freely deflected toward the outer diameter 4a or the inner diameter 4b, as shown by Arrow C.

With this structure, the entirety of the above-mentioned cylindrical protuberance 4 is configured such that the outer diameter 4a and the inner diameter 4b can be expanded and contracted as shown in FIG. 3.

The elastic member 5 that encompasses the outer diameter 4a of the protuberance 4 shown in FIG. 2 is formed of rubber or another stretchable elastic material such as "Super Toriburen"™ manufactured by Shinko Kasei K.K., such that when the outer diameter 4a or inner diameter 4b of the cylindrical protuberance 4 expands or contracts, the outer diameter 5a correspondingly expands or contracts as shown by Arrow C.

Figure 4:
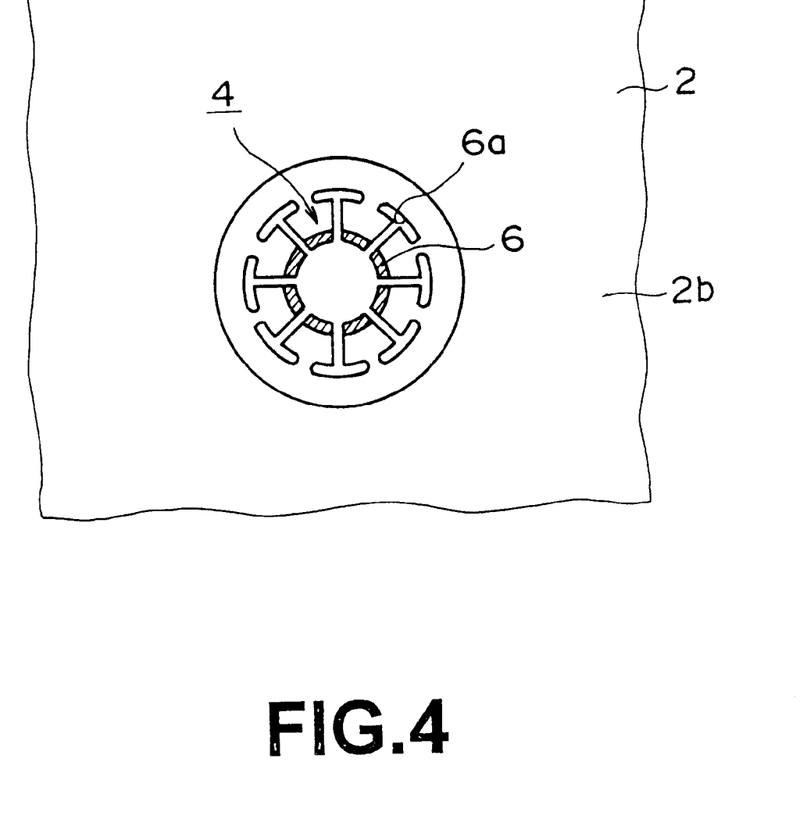
FIG. 4 is a sectional view at line B—B of FIG. 1 with the elastic member omitted, showing a further embodiment of the slit.

The slits 6a formed between the protruding members 6 have an approximate L-shape as shown in FIG. 3, but the slits 6a can also have an approximate T-shape, as shown in FIG. 4, where identical reference numerals are used to designate the same parts as in FIG. 3. What is essential is that any shape can be adopted as long as it allows the protruding members 6 to freely deflect in the directions shown by Arrow C.

In the central portion of the inner surface 3b of the aforementioned lid 3, a cylindrical protrusion 10 is integrally formed at a position facing the protuberance 4 of the case body 2, as shown in FIG. 1.

The protrusion 10 has a tip 10a with a diameter L2 that is slightly smaller than the value L3 of the inner diameter 4b of the protuberance 4 (L2<L3), and a base 10b with a diameter L4 that is larger than the value L3 of the inner diameter 4b of the protuberance 4 (L4>L3), such that overall the protrusion 10 has a taper-shaped cross-section.

Figure 5:
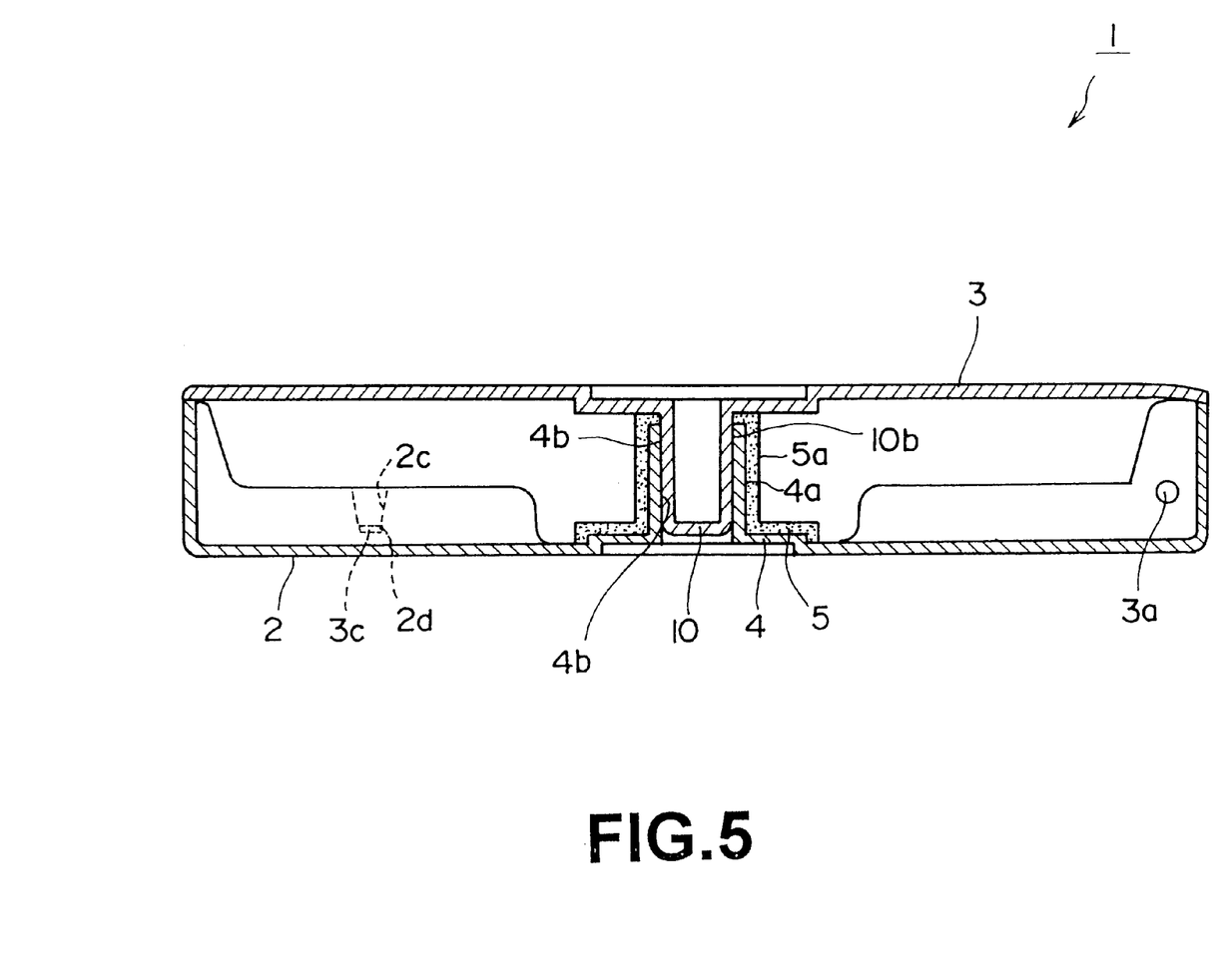
FIG. 5 is a schematic sectional view of a disc storage case according to the present invention.

When the lid 3 is rotated counter-clockwise about an axis 3a as shown by Arrow A to cover the top of the case body 2, the protrusion 10 is inserted into the inner diameter 4b of the protuberance 4, whereupon the outer diameter 4a of the protuberance 4 is expanded by the base 10b of the protrusion 10 as shown in FIG. 5, and the outer diameter 5a of the elastic member 5 is also expanded in response to the expansion of the outer diameter 4a of the protuberance 4.

The reference number 3c in FIG. 1 represents positioning protuberances that protrude from the inside of both sides of the lid 3, and when the case body 2 is covered by the lid 3, these positioning protuberances 3c are inserted inside the slots 2d via the guidance groves 2c formed on the outside of both sides of the left side of the case body 2 (as shown in Fig. 5) for positioning and supporting the lid 3 by the case body 2.

An explanation of an operation of the above-mentioned disc storage case 1 is given hereafter.

Figure 6:
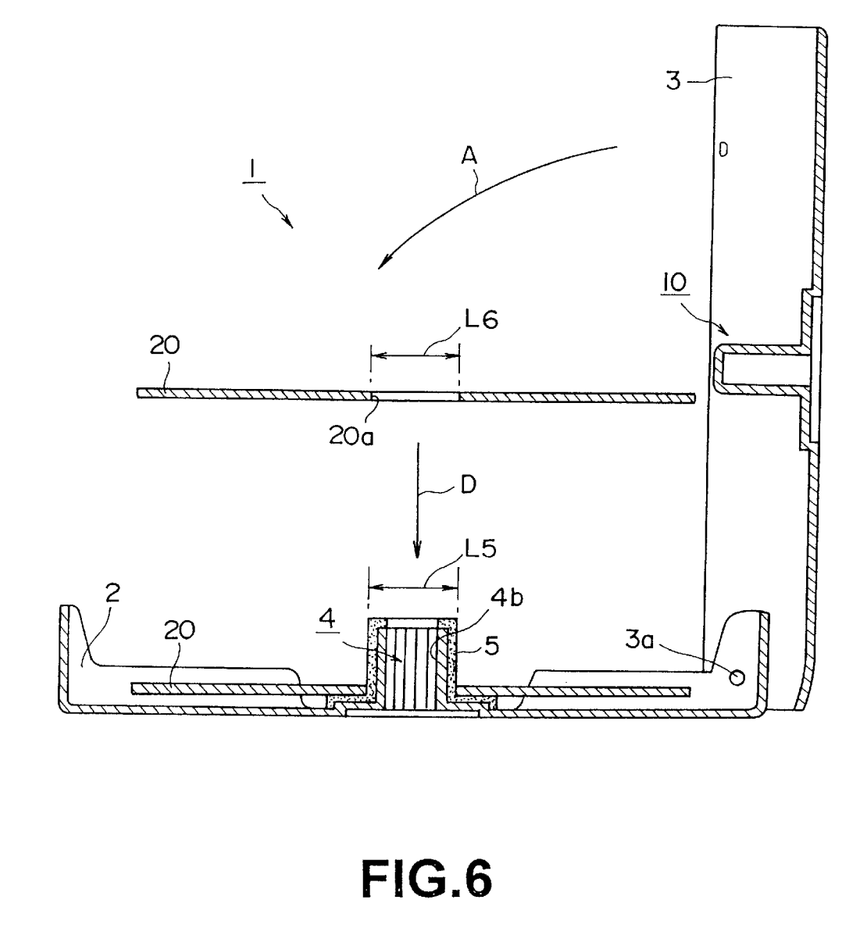
FIG. 6 is a schematic sectional view showing an operation of a disc storage case according to the present invention.

As shown in FIG. 6, where identical reference numerals are used to designate the same parts as in FIG. 1, in order to load a disc 20, such as a compact disc (CD), CD-ROM, or CD-RAM, in the disc storage case 1, the round positioning hole 20a formed in the center of the disc 20 is first positioned opposite the protuberance 4, which is encompassed by the elastic member 5, and then the positioning hole 20a is fitted over the elastic member 5 so that the protuberance 4 is inserted into the positioning hole 20a. The outer diameter L5 of the protuberance 4 is formed in advance to be slightly smaller as than the diameter L6 of the positioning hole 20a of the disc 20 (L5<L6), so that when the disc 20 is lowered in the direction shown by Arrow D, the positioning hole 20a of the disc 20 fits smoothly over the protuberance 4, which is encompassed by the elastic member 5.

When the lid is about the center of the axis 3a rotated in the counter-clockwise direction as shown by Arrow A, the protrusion 10 of the lid 3 is inserted into the inner diameter 4b of the protuberance 4.

Figure 7:
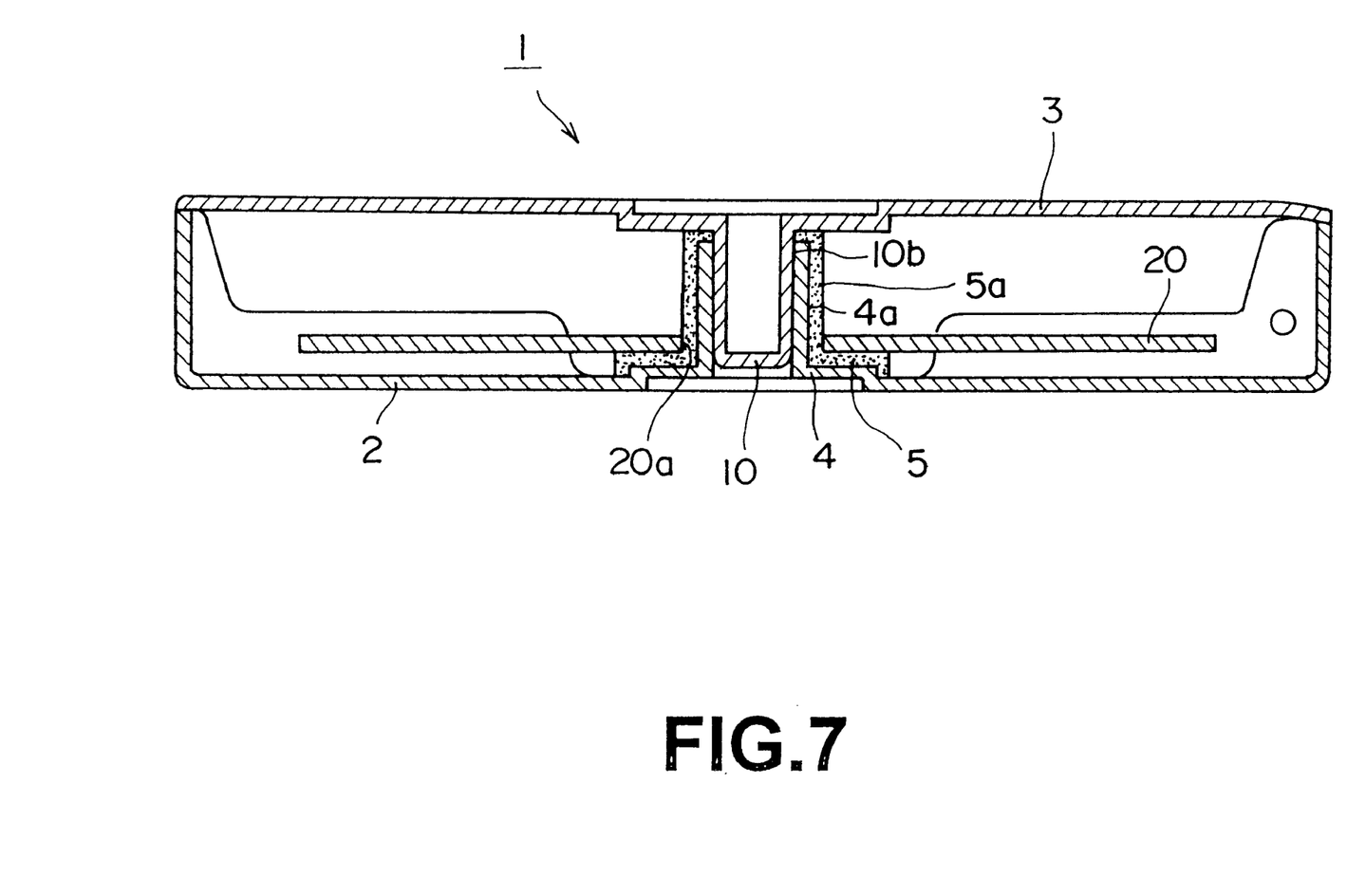
FIG. 7 is a schematic sectional view showing an operation of a disc storage case according to the present invention.

The outer diameter 4a of the protuberance 4 is then expanded by the base 10b of the protrusion 10 of the lid 3 as shown in FIG. 7, and then the outer diameter 5a of the elastic member 5 is expanded corresponding to the expansion of the outer diameter 4a of the protuberance 4, so the outer diameter 5a of the elastic member 5 and the positioning hole 20a in the disc 20 are pressed tightly against each other, forming a frictional contact, while areas of the elastic member S other than those opposite the positioning hole 20a of the disc 20 expand and lock the positioning hole 20a of the disc 20 in place. Thus, the disc 20 is securely supported on the protuberance 4 by the external peripheral surface of the elastic member 5.

Figure 8:
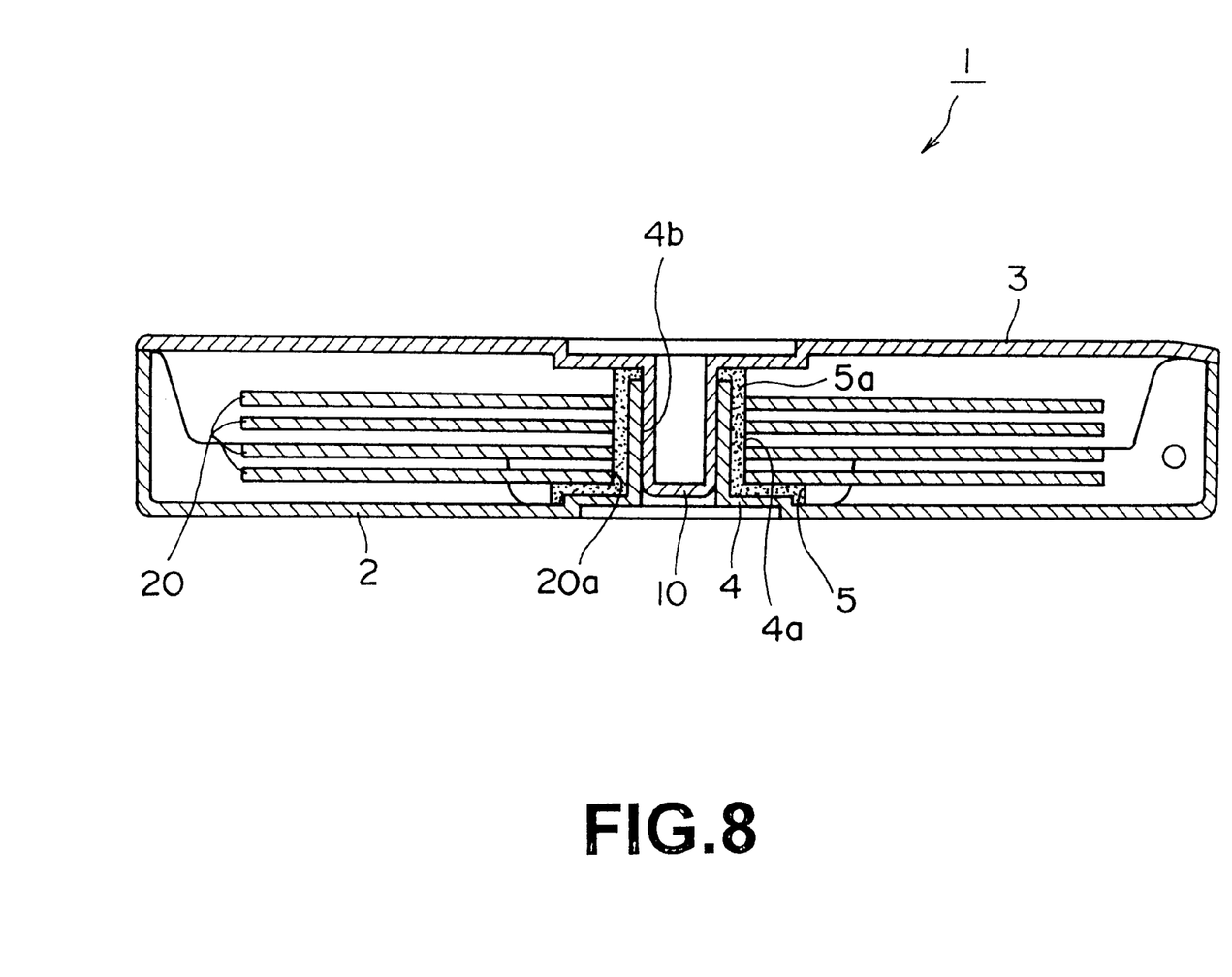
FIG. 8 is a schematic sectional view showing an operation of a disc storage case according to the present invention.

Further, when loading a plurality of discs 20 in the disc storage case 1, the same operation as shown in FIG. 6 is used. First, press a plurality of discs 20 in order over the protuberance 4, which is encompassed by the elastic member 5. When the case body 2 is covered by the lid 3, the outer diameter 5a of the elastic member 5 and the positioning holes 20a of the discs 20 are pressed tightly against each other, forming a frictional contact as shown in FIG. 8, where identical reference numerals are used to designate the same parts as in FIG. 7. At the same time, areas of the elastic member 5 other than those opposite the positioning hole 20a of each disc 20 expand and lock the positioning hole 20a of each disc 20 in place. Thus, the discs 20 are supported on the protuberance 4 by the external peripheral surface of the elastic member 5, and are securely supported by the external peripheral surface of the elastic member 5 without moving relative to each other.

With the above operations, the discs 20 do not move relative to each other or touch each other, and damage to the discs 20 is thus avoided, even when the disc storage case 1 in which the discs 20 are stored is carried around The number of discs 20 stored in the disc storage case 1 is not limited, and any number of discs can be stored by setting the height L1 of the protuberance 4 shown in FIG. 1 to an appropriate level.

In the above embodiment the protrusion 10 is integratedly formed in the center of the lid 3, but the present invention is not limited to the above embodiment, and the protrusion 10 can be formed as a separate piece from the lid 3 such that this separate protrusion 10 is inserted into the inner diameter 4a of the protuberance 4 before the case body 2 is covered with the lid 3.

When the protrusion 10 is formed as a separate piece from the lid 3 in the above manner, an instruction manual or other document can be inserted into the space formed between the lid 3 and the protrusion 10.

As was explained above, the present invention relates to a disc storage case for storing a plurality of discs having an arrangement comprising a case body having a cylindrical protuberance, the outer diameter of which is encompassed by an elastic member, and a protrusion that freely enters and exits the inner diameter of the protuberance, making it possible to simplify the resulting structure and to markedly reduce the number of parts in a disc storage case for storing a plurality of discs, and hence to reduce the number of processes required to manufacture a disc storage case for storing a plurality of discs and to provide a disc storage case for storing a plurality of discs at a low cost.

Further, because the present invention utilizes an arrangement of one lid and one case body to form a disc storage case for storing a plurality of discs, the operation required to load or remove a large number discs is greatly simplified even when loading or removing a plurality of discs, and this operation can be accomplished by opening and closing the lid just once.

The present invention can embody a variety of other aspects without deviating from the spirit or the principle characteristics thereof and, therefore, the above embodiment in a variety of respects is just one example and should not be restrictively interpreted. The scope of the present invention is shown by the scope of the claims and is restricted in no way by the specification. Further, the scope of the present invention encompasses all variations and changes within the equivalent scope of the claims.

What is claimed is:

1. A disc storage case for storing discs having a round positioning hole in the center thereof, comprising:

a case body having in a center thereof a cylindrical protuberance whose inner diameter and outer diameter are expandable and contractible;

a cylindrical elastic member disposed so as to encompass the outer diameter of the protuberance;

a cylindrical protrusion that freely enters and exits the inner diameter of the protuberance and that causes the outer diameter of the protuberance to expand when inserted into the inner diameter of the protuberance; and a lid for covering the case body, wherein the positioning hole of the disc is fitted over the protuberance via the elastic member and the protrusion is inserted into the inner diameter of the protuberance so that the outer diameter of the elastic member is expanded via the protuberance and the disc is supported on the protuberance by mating the positioning hole with the peripheral surface of the elastic member.

2. The disc storage case according to claim 1, wherein the protrusion and the lid are formed integratedly with each other.

3. The disc storage case according to claim 1, wherein the protuberance has a plurality of protruding members arranged in a circle, and slits are formed between adjacent ones of the plurality of protruding members.

4. The disc storage case according to claim 1, wherein the protrusion is tapered in cross section such that tip diameter thereof is smaller than the inner diameter of the protuberance, and the base diameter thereof is larger than the inner diameter of the protuberance.

5. The disc storage case according to claim 1, wherein the elastic member is an elastic body that freely expands and contracts such as rubber.

* * * * *